Figure 1:
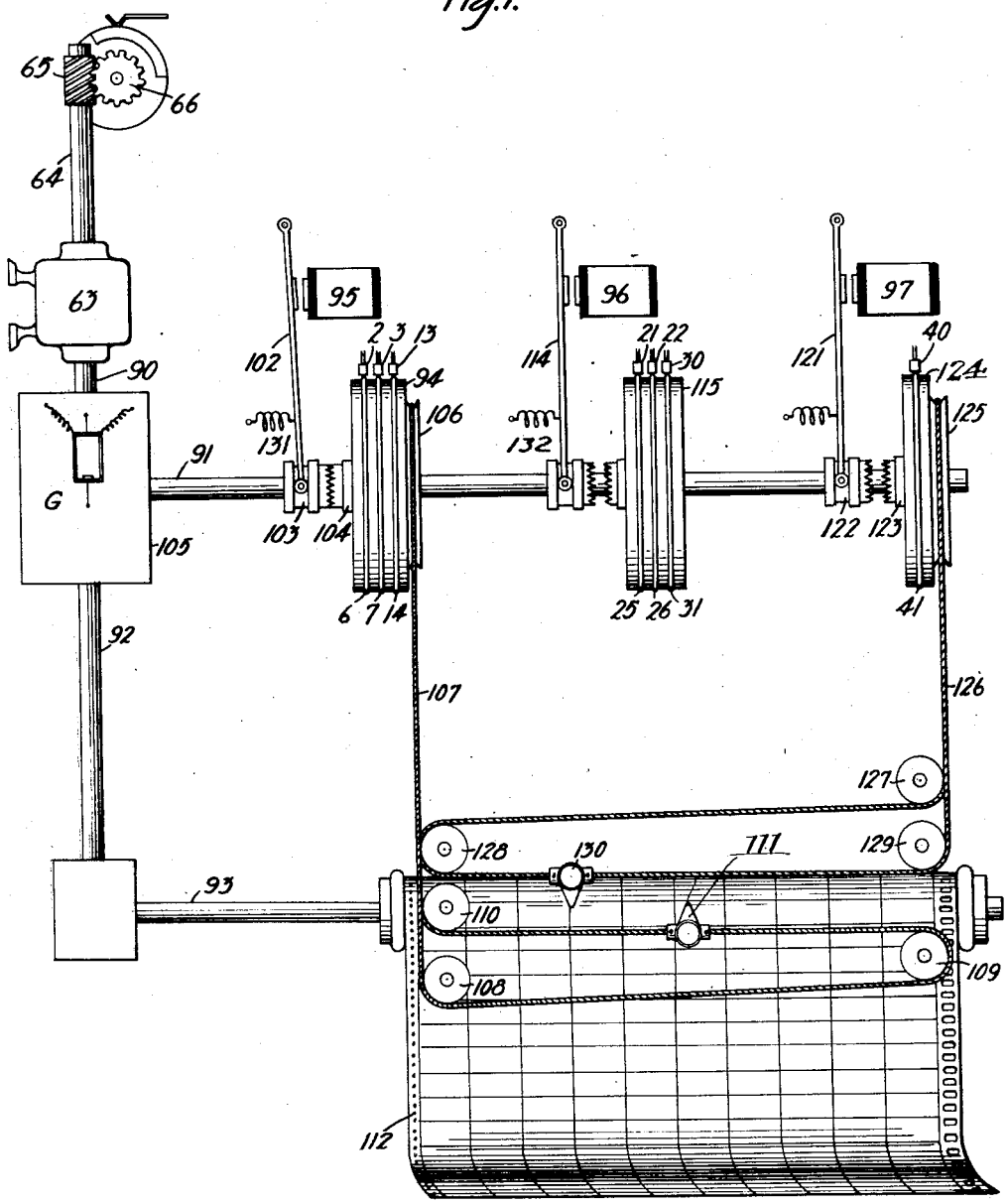

May 13, 1924.

E. B. WOOD

MEASURING AND RECORDING DEVICE

Filed Dec. 30, 1922  2 Sheets-Sheet 1

1,493,586

Inventor:
Ernest B. Wood.
by [signature] Att'y.

May 13, 1924.
E. B. WOOD
MEASURING AND RECORDING DEVICE
1,493,586
Filed Dec. 30, 1922      2 Sheets-Sheet 2
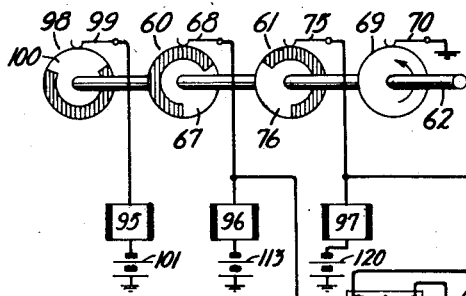
Fig.2.
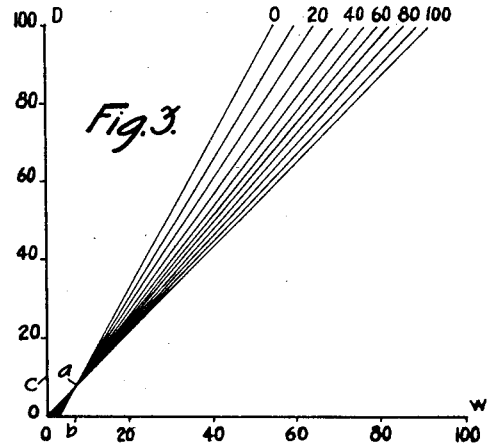
Fig.3.
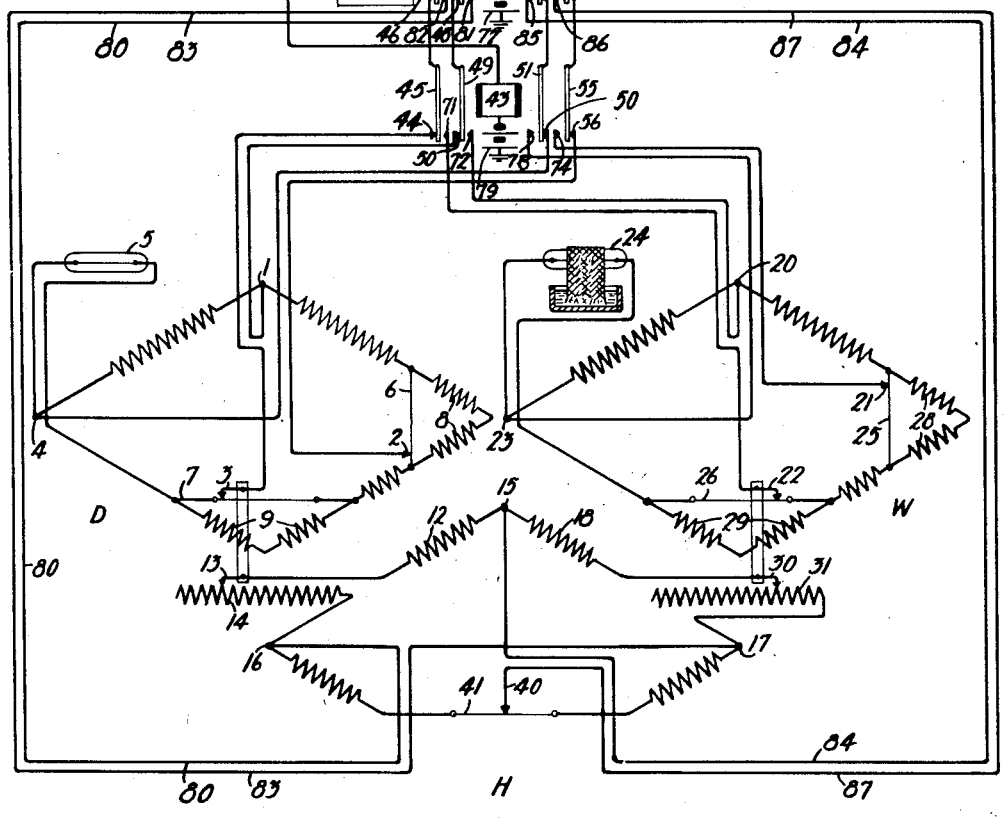
Inventor:
Ernest B. Wood.
by [signature]
Att'y Patented May 13, 1924.

1,493,586

UNITED STATES PATENT OFFICE.

ERNEST B. WOOD, OF CHATHAM, NEW JERSEY, ASSIGNOR TO WESTERN ELECTRIC COMPANY, INCORPORATED, OF NEW YORK, N. Y., A CORPORATION OF NEW YORK.

MEASURING AND RECORDING DEVICE.

Application filed December 30, 1922. Serial No. 609,966.

*To all whom it may concern:*

Be it known that I, ERNEST B. WOOD, a citizen of the United States, residing at Chatham, in the county of Morris, State of New Jersey, have invented certain new and useful Improvements in Measuring and Recording Devices, of which the following is a full, clear, concise, and exact description.

This invention relates to measuring and recording devices being particularly applicable to a device for continuously measuring and recording values of relative humidity.

The object of the invention is in general to provide a method of measuring relative humidity and to provide means for continuously recording the measured values although in its broader aspects the invention is not limited to this application.

Values of relative humidity are usually determined by calculation from the readings of wet bulb and dry bulb thermometers, which are exposed to the atmosphere. When it has been desired to obtain a record of relative humidity over a period of time, means have been provided for continuously recording the values of wet and dry bulb temperatures, but with such a record it is necessary to make numerous calculations and plot a third curve to show the variation in relative humidity. By means of the present invention, a curve of relative humidity is plotted directly in accordance with the variations in wet bulb and dry bulb temperatures.

A Wheatstone bridge which comprises a dry resistance thermometer contained in one of its arms is periodically and automatically balanced thereby periodically measuring dry bulb temperatures. This bridge may be conveniently termed "the dry bulb bridge." A second Wheatstone bridge comprising a wet resistance thermometer contained in one of its arms is likewise automatically and periodically balanced, thus periodically measuring wet bulb temperatures. This bridge may be conveniently termed "the wet bulb bridge." A third Wheatstone bridge, which may be conveniently termed "the humidity bridge," is mechanically so associated with the first two bridges that upon a balancing of the dry bulb bridge, the impedance of an arm of the humidity bridge is adjusted to a value which is a function of dry bulb temperatures. Likewise, upon a balancing of the wet bulb bridge, the impedance of a second arm of the humidity bridge is adjusted to a value which is a function of wet bulb temperatures. The balancing of the humidity bridge is automatically and periodically accomplished, the bridge being arranged so that the balance measures directly, the relative humidity which is, as is well known, a function of dry bulb and wet bulb temperatures. Associated with the humidity bridge are curved drawing means which plot a curve with humidity as ordinates against time as abscissas.

Referring to the drawings, Fig. 1 shows diagrammatically, the arrangement of the curve drawing apparatus and a portion of the mechanical means for automatically balancing the Wheatstone bridges; Fig. 2 is a schematic diagram showing the circuit connections associated with the three Wheatstone bridges; and Fig. 3 is a diagram showing relative humidity curves plotted with dry bulb temperatures as ordinates and wet bulb temperatures as abscissas.

Referring to Fig. 3, it is seen that each of the humidity curves is a straight line and that, with an accuracy sufficient for practical purposes, these curves representing humidities of from 0% to 100% intersect at a single point $a$ whose coordinates are $(b, c)$. It being known that the humidity curves are straight lines passing through point $a$, the value of humidity is completely determined if the slope of that particular curve is known, since each curve represents only one value of humidity. It is apparent that the slope is given by the ratio of dry bulb temperature minus the ordinate of point $a$ to wet bulb temperature minus the abscissa of point $a$; or in other words, the relative humidity is completely determined, if the dry bulb and the wet bulb temperatures are each known, above the datum coordinates $(b, c)$ of point $a$.

The dry bulb bridge which is denoted in general by D comprises ratio arms 1—2 and 2—3, arm 3—4 containing the dry resistance thermometer 5, resistance arm 1—4, and balancing slide wires 6 and 7. Slide wires 6 and 7 are preferably of substantial resistance having relatively low resistance shunts 8 and 9, respectively. The bridge is automatically balanced by shifting points 2 and 3 along slide wires 6 and 7 respectively. The means for automatically balancing this bridge and each of the other bridges forms no part of the present invention and hence a detailed description of this mechanism is not thought to be necessary. This mechanism is described in U. S. Patent to Leeds No. 1,125,699 of January 19, 1915. Points 2 and 3 are moved so that the resistance of arm 1—2 is always equal to the arm 2—3, and hence at a balance the resistance of arm 3—4 is equal to the resistance of arm 1—4, which is constant. It is apparent that at a balance, the position of point 3 will be a measure of the temperature of dry resistance thermometer 5.

Point 13 which is mechanically associated with point 3, cooperates with slide wire 14 to cause the resistance of arm 15—16 of humidity bridge H to vary in accordance with the variation in resistance of dry thermometer 5. The arrangement is such that upon a balance of bridge D at any given temperature $t°$ within its range, the resistance of bridge arm 15—16 is adjusted to a value which is proportional to the resistance of thermometer 5 at $t°$ minus its resistance at $c°$. Suppose, for example that dry bulb bridge D is constructed to have a range from 55° to 110°. Slide wire 14 is of suitable size and is arranged so that no portion of it is contained in arm 15—16 when bridge D is balanced at 55°. Resistance 12 is then to be selected to have a value equal to the resistance layed off by point 13 on slide wire 14 for a temperature change equal to 55° minus $c°$. In this way the balancing of bridge D at any temperature $t°$ between 55° and 110°, always leaves bridge arm 15—16 with a resistance proportional to the resistance of thermometer 5 at $t°$ minus its resistance at $c°$. Thermometer 5 is made of material having linear temperature-resistance characteristic, which means that the resistance of bridge arm 15—16 is proportional to $(t°—c°)$.

The wet bulb bridge which is denoted in general by W comprises ratio arms 20—21 and 21—22, resistance arm 20—23, arm 22—23 which contains wet resistance thermometer 24, and balancing slide wires 25 and 26. Slide wires 25 and 26 are similar to slide wires 6 and 7 and are preferably shunted by relatively low resistances 28 and 29 respectively. The wet bulb bridge is arranged similarly to the dry bulb bridge and controls the resistance of arm 15—17 of the humidity bridge so that arm 15—17 always has a resistance which is proportional to the resistance of wet resistance thermometer 24 minus its resistance at the temperature $b°$. Suppose for example, the wet bulb bridge is constructed to have an operating range from 50° to 100° F. Resistance 18 is selected to be proportional at the resistance of thermometer 24 to 50° minus its resistance at $b°$ and the arrangement of mechanically associated points 22 and 30 is such that at a balance of the wet bulb bridge at 50°, no part of variable resistance 31 is inserted into bridge arm 15—17. Points 22 and 30, and resistance 31 are arranged so that when the bridge is balanced at any given wet bulb temperature between 50° and 100° a sufficient amount of resistance 31 is inserted into arm 15—17 to make the total resistance of arm 15—17 proportional to the resistance of thermometer 24 at the given temperature minus its resistance at a temperature of $b°$.

The humidity bridge which is denoted in general by H is automatically and periodically balanced by shifting point 40 along slide wire 41 and since the impedance of arm 15—16 is always proportional to dry bulb temperature minus $c°$ and the resistance of arm 15—17 is always proportional to wet bulb temperature minus $b°$, it is apparent from the previous consideration of Fig. 3 that the position of point 40 at a balance of bridge H will be an indication of the relative humidity.

Bridges D, W, and H are successively balanced in rotation and means are provided for using the same galvanometer G and the same source of direct current B in conjunction with each of the three bridges. With relays 42 and 43 in the non-operated position as shown, galvanometer G, and battery B are connected across points 1—3 and 2—4 respectively of dry bulb bridge D. The galvanometer circuit may be traced from point 3 to relay contact 44, armature 45, armature 46, galvanometer coil G, armature 47, contact 48, armature 49, and contact 50 to point 1. The battery circuit may be traced from point 4 to contact 150, armature 51, armature 52, battery B, armature 53, contact 54, armature 55, and contact 56 to point 2.

Relays 42 and 43 are under the control of commutators 60 and 61 mounted upon a shaft 62 as shown. This shaft is rotated at constant speed by means of motor 63, shaft 64 and spiral gears 65 and 66 which are shown in Fig. 1. When commutator segment 67 makes contact with brush 68, current flows from grounded battery 79 through operating winding of relay 43, brush 68, commutator segment 67, slip ring 69 and brush 70 to ground, thus bringing relay 43 into the operated position. This disconnects galvanometer G and battery B from dry bulb bridge D and connects them to wet bulb bridge W. Galvanometer G is connected across corners 20—22 of bridge W as follows: from point 22 to contact 71, armature 45, armature 46, galvanometer coil G, armature 47, contact 48, armature 49, and contact 72 to point 20. The connection of battery B across bridge corners 21 and 23 may be traced from corner 21 to relay contact 74, armature 55, contact 54, armature 53, battery B, armature 52, armature 51, and contact 78 to corner 23. After a definite time interval, connection is broken between brush 68 and commutator segment 67 and connection is made between brush 75 and commutator segment 76, thus allowing relay 43 to return to the non-operated position and current to flow from grounded battery 77 through operating winding of relay 42, to brush 75, commutator segment 76, slip ring 69 and brush 70 to ground thus bringing relay 42 into the operated position. This shifts the connection of the galvanometer and battery to the humidity bridge H.

The connection of the galvanometer across corners 16 and 17 of the bridge H may be traced from corners 16 to conductor 80, contact 81, armature 47, galvanometer coil G, armature 46, contact 82 and conductor 83 to point 17. The connection of the battery across corners 15—40 may be traced from corner 15 to conductor 84, contact 85, armature 52, battery B, armature 53, contact 86 and conductor 87 to point 40.

Referring to Fig. 1, motor 63 drives at a constant speed, shafts 64, 90, 92 and 93. Also, by means of gears 65 and 66, it drives at constant speed, shaft 62 shown in Fig. 2. Rotatably mounted upon shaft 91 is an insulating drum 94 carrying the slide wires 6 and 7 of the dry bulb bridge shown in Fig. 2, and the slide wire 14 of the humidity bridge. Contact members 2, 3 and 13 correspond to points 2, 3 and 13 of Fig. 2. Clutch controlling magnets 95, 96 and 97 are under the control of commutators 98, 60 and 61, respectively, as shown in Fig. 2. When shaft 62 is in such a position that brush 99 makes contact with commutator segment 100, current flows from grounded battery 101 through magnet 95 to brush 99, commutator segment 100, slip ring 69 and brush 70 to ground thus actuating arm 102 which moves to the right clutch member 103 that is splined to shaft 91. Drum 94 is normally rotatable about shaft 91 but the engagement of clutch member 103 with the corresponding portion 104, keys drum 94 to the shaft. In this condition, galvanometer G and battery B are associated with dry bulb bridge D and the bridge is automatically balanced by rotation of shaft 91 until the relation between contacts 2 and 3 and slide wires 6 and 7 respectively are such as to bring the bridge into balance. The movement of shaft 91 is accomplished by mechanism 105 controlled by the deflection of galvanometer G. This mechanism which is indicated by 105 forms no part of the present invention, being that described in the patent to Leeds No. 1,125,699 of January 19, 1915.

Attached to drum 94 is a pulley 106 around which is passed a cord 107 that passes around pulleys 108, 109 and 110, and carries a recording pen 111. It is apparent that for any given dry bulb temperature, a balance of the bridge D will only be obtained by a definite angular positioning of drum 94 and hence pen 111 will take up a position on chart 112 which is a measure of the dry bulb temperature. Chart 112 is advanced at uniform speed and if the bridge is periodically balanced at sufficiently close intervals, pen 111 will trace a curve on chart 112, indicating the variation of dry bulb temperature over a period of time.

As shaft 62 continues to rotate, brush 99 will break contact with segment 100 thus deenergizing operating magnet 95 and allowing spring 131 to disengage clutch members 103 and 104. Any further rotation of shaft 91 will therefore, not alter the position of drum 94. When commutator segment 67 makes contact with brush 68, current will flow from grounded battery 113 through operating magnet 96 to brush 68, commutator segment 67, slip ring 69 and brush 70 to ground thus causing magnet 96 to move arm 114 to the right and key to the shaft drum 115, which is arranged with a clutch member as shown, in the same manner as drum 94. Drum 115 carries slide wires 25, 26 and 31 corresponding to the slide wires 25, 26 and 31 shown in Fig. 2. Making contact with these slide wires are contact members 21, 22 and 30 respectively, corresponding with points 21, 22 and 30 respectively, of Fig. 2. As has previously been shown, galvanometer G and battery B are now connected to wet bulb bridge W and hence mechanism 105 will vary the position of drum 115 until the wet bulb bridge is balanced. As shaft 62 rotates further brush 68 breaks contact with commutator segment 67 thus allowing spring 132 to retract arm 114 and leave drum 115 stationary in its adjusted angular position.

When brush 75 makes contact with commutator segment 76 current flows from grounded battery 120 through operating magnet 97, brush 75, commutator segment 76, slip ring 69 and brush 70 to ground. Magnet 97 thereupon moves arm 121 to the right causing engagement of clutch members 122 and 123 so as to key drum 124 to shaft 91. In this condition, as has previously been shown, galvanometer G and battery B are connected to the humidity bridge H. The drum 124 carries slide wire 41 of the humidity bridge H, which makes contact with contact member 40 of the humidity bridge H. Under the control of mechanism 105 and galvanometer G, drum 124 is positioned so as to balance the humidity bridge. It is apparent that arms 15—16 and 15—17 of bridge H have resistances which are respectively proportional to dry bulb temperature minus $c°$ and the wet bulb temperature minus $b°$ and hence when the bridge is balanced, the relation of slide wire 41 to point 40 will be a measure of the relative humidity. It is obvious therefore that the angular position to which drum 124 is positioned in order to obtain a balance of the humidity bridge will be a direct measure of relative humidity.

Attached to drum 124 is a grooved pulley 125 around which is passed a cord 126 which likewise passes around pulleys 127, 128 and 129. Cord 126 carries a recording pen 130 and it is apparent that for any given relative humidity, pen 130 will take up a definite position on chart 112 and hence its position on chart 112 will measure directly the value of relative humidity. Since pen 130 is positioned periodically at frequent intervals, a curve will be drawn upon chart 112 showing the variation in relative humidity over a period of time.

It is seen that the three bridges, the dry bulb bridge, the wet bulb bridge and the humidity bridge are automatically balanced in rotation using the same galvanometer, battery, and balancing mechanism, without requiring the attention of an operator. By means of this apparatus, curves may be obtained showing both the variation in humidity and dry bulb temperatures over an extended period of time, the apparatus only requiring the attention of an operator to renew chart 112, refill pens 130 and 111, etc. To facilitate the selecting of values from the finished record, it is preferable that chart 112 be printed with two scales of ordinates, one for temperature, and the other for humidity.

The invention claimed is:

1. A method of indicating values of relative humidity which comprises balancing an electrical bridge in which one arm has an impedance proportional to dry bulb temperature minus a constant and another arm has an impedance proportional to wet bulb temperature minus a constant.

2. A method of indicating values of relative humidity which comprises balancing an electrical bridge in which one arm has an impedance equal to a function of dry bulb temperature and another arm has an impedance equal to a function of wet bulb temperature.

3. A method of indicating values of relative humidity which comprises adjusting the impedance of an arm of an electrical bridge to a value which is proportional to the resistance of a dry resistance thermometer minus a constant, adjusting the impedance of another arm of said bridge to a value which is proportional to the resistance of a wet resistance thermometer minus a constant and balancing said bridge.

4. A method of indicating values of relative humidity which comprises adjusting the impedance of an arm of an electrical bridge to a value which is a function of the resistance of a dry resistance thermometer, adjusting the value of the impedance of a second arm of said bridge to a value which is a function of the resistance of a wet resistance thermometer, and balancing said bridge.

5. In combination, a plurality of electrical bridges, means for adjusting the impedance of an arm of the first bridge in accordance with the balance of a second bridge, means for adjusting the impedance of a second arm of the first bridge in accordance with the balance of a third bridge, and means for balancing said first bridge.

6. In combination, plurality of electrical bridges, means for adjusting the impedance of an arm of the first bridge in accordance with a balance of a second bridge, means for adjusting the impedance of a second arm of said first bridge in accordance with the balance of a third bridge, means for balancing said first bridge, and means for recording the balance of said first bridge.

7. In combination, a plurality of electrical bridges, means for adjusting the impedance of an arm of the first bridge in accordance with the balance of a second bridge, means for adjusting the impedance of a second arm of the first bridge in accordance with the balance of a third bridge, means for balancing said first bridge, and means for recording the balance of a plurality of said bridges.

8. In combination, a plurality of electrical bridges, means for adjusting the impedance of an arm of the first bridge in accordance with the balance of a second bridge, means for adjusting the impedance of a second arm of the first bridge in accordance with the balance of a third bridge, means for balancing said first bridge, and means for recording the balance of two of said bridges.

9. In a humidity indicating device, an electrical bridge, means for adjusting the impedance of an arm of said bridge to a value proportional to dry bulb temperature minus a constant, means for adjusting the impedance of another arm of said bridge to a value proportional to wet bulb temperature minus a constant, and means for balancing said bridge.

10. In a humidity indicating device, an electrical bridge, means for adjusting the impedance of an arm of said bridge to a value which is a function of dry bulb temperature, means for adjusting the impedance of a second arm of said bridge to a value which is a function of wet bulb temperature, and means for balancing said bridge.

11. In a humidity indicating device, an electrical bridge, means for adjusting the impedance of an arm of said bridge to a value proportional to dry bulb temperature minus a constant, means for adjusting the impedance of a second arm of said bridge to a value proportional to wet bulb temperature minus a constant, means for balancing said bridge, and means for recording the balance of said bridge directly in terms of relative humidity.

12. In a humidity indicating device, an electrical bridge, means for adjusting the impedance of an arm of said bridge to a value which is a function of dry bulb temperature, means for adjusting the impedance of a second arm of said bridge to a value which is a function of wet bulb temperature, means for balancing said bridge, and means for recording the balance of said bridge.

13. In a humidity indicating device, an electrical bridge, means for periodically adjusting the impedance of an arm of said bridge to a value proportional to dry bulb temperature minus a constant, means for periodically adjusting the impedance of a second arm of said bridge to a value proportional to wet bulb temperature minus a constant, means for periodically balancing said bridge, and curve drawing means for recording the balance of said bridge in terms of relative humidity.

14. In a humidity indicating device, an electrical bridge, means for adjusting the impedance of an arm of said bridge to a value which is a function of dry bulb temperature, means for adjusting the impedance of a second arm of said bridge to a value which is a function of wet bulb temperature, means for balancing said bridge, and curve drawing means for recording directly relative humidity and dry bulb temperature.

In witness whereof I hereunto subscribe my name this 29th day of December, A. D. 1922.

ERNEST B. WOOD.